US010448392B2

(12) United States Patent
Yang et al.

(10) Patent No.: US 10,448,392 B2
(45) Date of Patent: Oct. 15, 2019

(54) METHOD, DEVICE, AND SYSTEM FOR SCHEDULING TRANSMISSION OF A STATUS UPDATE IN A TIME DIVISION MULTIPLE ACCESS (TDMA) COMMUNICATION SYSTEM

(71) Applicant: MOTOROLA SOLUTIONS, INC., Chicago, IL (US)

(72) Inventors: Yunhai Yang, Elgin, IL (US); Daniel J. McDonald, Cary, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/591,649

(22) Filed: May 10, 2017

(65) Prior Publication Data

US 2018/0332578 A1 Nov. 15, 2018

(51) Int. Cl.
*H04W 72/04* (2009.01)
*H04B 7/26* (2006.01)
*H04J 3/16* (2006.01)
*H04W 72/12* (2009.01)

(52) U.S. Cl.
CPC ...... *H04W 72/0446* (2013.01); *H04B 7/2653* (2013.01); *H04J 3/1694* (2013.01); *H04W 72/048* (2013.01); *H04W 72/0413* (2013.01); *H04W 72/1257* (2013.01)

(58) Field of Classification Search
None
See application file for complete search history.

(56) References Cited

U.S. PATENT DOCUMENTS

2011/0105168 A1* 5/2011 McDonald ............ H04W 76/45
455/509

OTHER PUBLICATIONS

Office Action from the Canadian Intellectual Property Office for Application No. 3002445 dated Feb. 18, 2019 (3 pages).
Australian Office Action dated May 10, 2019 for corresponding Australian Application No. 2018203204 (3 pages).

* cited by examiner

*Primary Examiner* — Kouroush Mohebbi
(74) *Attorney, Agent, or Firm* — Michael Best & Friedrich LLP (57) ABSTRACT

A method, device, and system for scheduling a status update in a time division multiple access (TDMA) communication system. One method includes transmitting, with a call controller, scheduling information to the each of the plurality of communication devices via an outbound time slot associated with a control channel of a local common TDMA channel to schedule the each of the plurality of communication devices to transmit the status data in a pre-determined sequence. The method also includes receiving the status data from at least one of the plurality of communication devices in the pre-determined sequence.

17 Claims, 7 Drawing Sheets

METHOD, DEVICE, AND SYSTEM FOR SCHEDULING TRANSMISSION OF A STATUS UPDATE IN A TIME DIVISION MULTIPLE ACCESS (TDMA) COMMUNICATION SYSTEM

BACKGROUND OF THE INVENTION

Communication systems implementing time division multiple access (TDMA) use a common channel for communicating among multiple users by allocating unique time slots to different users. Subscribers of communication systems that implement TDMA are often organized into groups, which are sometimes referred to as talkgroups.

A communication system that implements TDMA may suspend status update services for a subscriber during an active call. For example, a location update service for a subscriber, that allows the subscriber to provide location data, may be suspended when the subscriber is part of an active call. Accordingly, depending on the duration of a call, the location of subscribers may not be updated for a significant period of time. Within the public safety industry, the lack of updated status data for subscribers, such as location data, may inhibit or limit subscriber location tracking, location-based dispatching, and other functionality that relies on updated status data for a subscriber.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As described above, a communication system implementing time division multiple access (TDMA) may suspend status update services for a subscriber when the subscriber is part of an active call. The status update services may allow a subscriber to send data separate from data, such as voice data, transmitted to talkgroup members as part of the active call (referred to herein as "call data"). Accordingly, the status data described herein may also be referred to as non-call data or a non-call update to distinguish it from call data. For example, a location update service may allow a subscriber to transmit a location. Without a mechanism to transmit such status data during an active call, updated status data for a subscriber may be outdated, unreliable, or unavailable. Furthermore, although a subscriber may override call data transmitted as part of the active call with status data to provide such status updates, this functionality may create gaps in the call data, may cause collisions as multiple subscribers may attempt to transmit status data at the same time, and may take a long time to receive status data for each subscriber depending on the size of the talkgroup. However, without updated status data, functionality that relies on updated status data from subscriber units, such as, among other things, tracking locations of the talkgroup members on a map, team tracking, and location-based dispatching, may not function properly.

Accordingly, embodiments described herein provide methods, devices, and systems for scheduling the transmission of status data within a TDMA communication system during an active call. In some embodiments, the transmission of the status data is scheduled so as to not impact audio. The transmission of the status data may also comply with Project 25 (P25 or Association of Public-Safety Communication Officials-International Project 25 (APCO-25)), the European Terrestrial Trunked Radio (TETRA) protocol, or other similar standards governing public safety organizations.

For example, one embodiment provides a method for scheduling transmission of status data from each of a plurality of communication devices in a time division multiple access (TDMA) communication system. The method includes transmitting, with a call controller, scheduling information to the each of the plurality of communication devices via an outbound time slot associated with a control channel of a local common TDMA channel to schedule the each of the plurality of communication devices to transmit the status data in a pre-determined sequence.

In some embodiments, the control channel is a slow associated control channel (SACCH). However, the present disclosure is not limited to using SACCH, and in other embodiments, during hang-time signaling, fast associated control channel (FACCH) may be used in place of SACCH as described herein.

The pre-determined sequence is a prioritized sequence. The priority of communication devices may be randomly assigned, assigned based on a member ranking configuration, assigned based on the next configured location cadence update, assigned based on the oldest location information since last update, or assigned based on a failed update from last scheduled attempt. The method also includes receiving the status data from at least one of the plurality of communication devices in the pre-determined sequence. As described herein, the terms "outbound" and "inbound" are with respect to the call controller.

In some embodiments, the method further includes transmitting, with the call controller, adjusted scheduling information to the each of the plurality of communication devices via the outbound time slot associated with the control channel of the local common TDMA channel to schedule the each of the plurality of communication devices to transmit the status data in a second pre-determined sequence in response to not receiving the status data from the each of the plurality of communication devices in the pre-determined sequence, the second pre-determined sequence being different than the pre-determined sequence. For example, the pre-determined sequence may be randomly assigned and the second pre-determined sequence may be assigned based on a failed update from the last scheduled attempt.

Another embodiment provides a portable communication device comprising an electronic processor. The electronic processor is configured to receive scheduling information from a call controller via an outbound time slot associated with a control channel of a local common time division multiple access (TDMA) channel. The electronic processor is also configured to transmit status data during an inbound time slot based on the scheduling information received from the call controller. As explained above, the "outbound time slot" and the "inbound time slot" are with respect to the call controller.

Yet another embodiment provides a TDMA communication system comprising a call controller. The call controller includes an electronic processor configured to transmit scheduling information to each of a plurality of communication devices via an outbound time slot associated with a control channel of a local common TDMA channel to schedule the each of the plurality of communication devices to transmit status data in a pre-determined sequence. The electronic processor is also configured to receive the status data from at least one of the plurality of communication devices in the pre-determined sequence.

Figure 1:
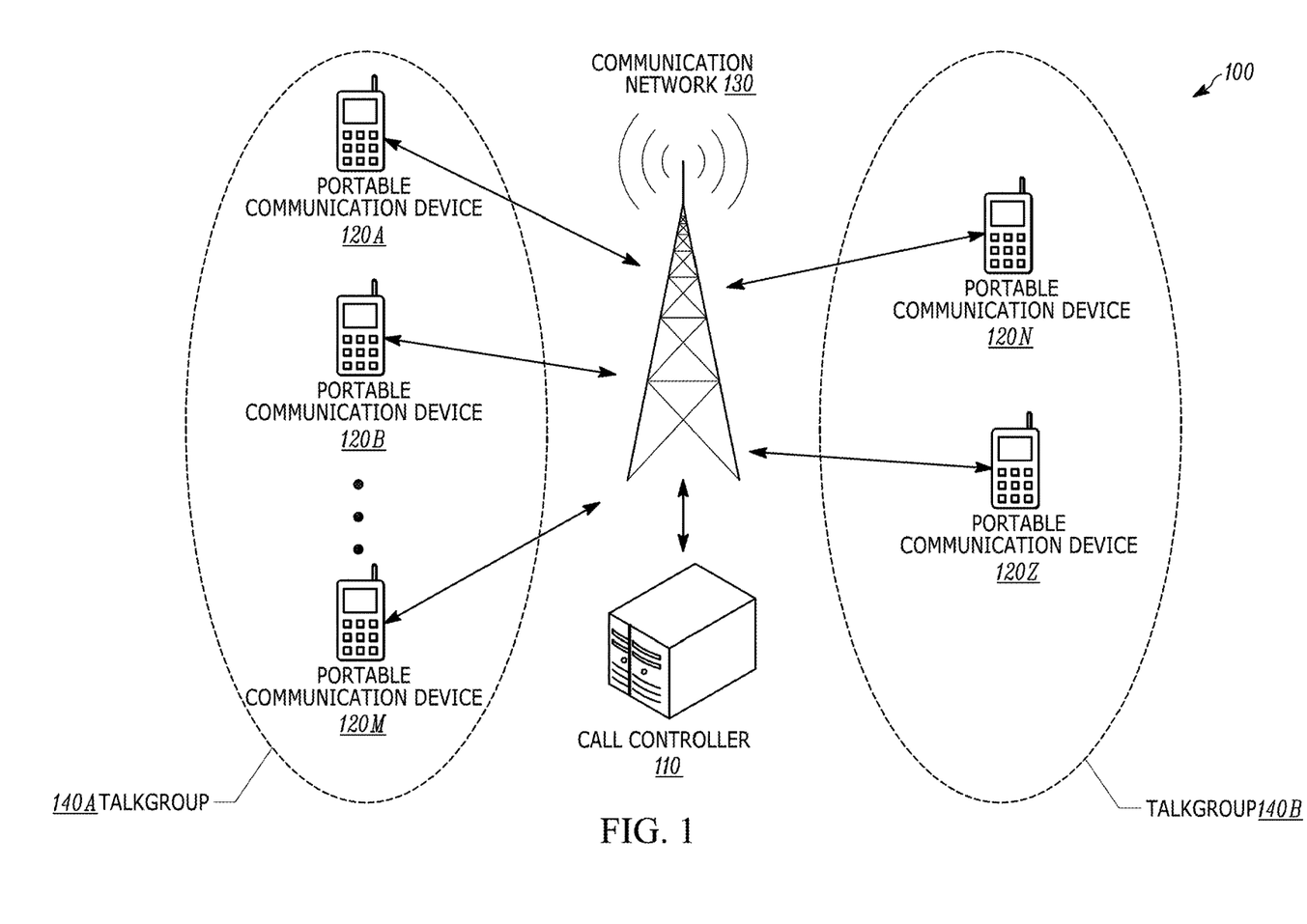
FIG. 1 is a diagram of a time division multiple access (TDMA) communication system in accordance with some embodiments.

FIG. 1 is a diagram of a TDMA communication system 100 according to one embodiment. The TDMA communication system 100 includes a call controller 110, a plurality of portable communication devices 120A through 120Z (one of the portable communication devices 120A through 120Z may be referred to herein as a portable communication device 120), and a communication network 130. The call controller 110 may be a computer-aided dispatch terminal for a public safety organization. The call controller 110 communicates with the plurality of portable communication devices 120A through 120Z via a communication network 130. The communication network 130 may be a wired or wireless communication network, such as a cellular network, a land mobile radio (LMR) network, or a combination of both operating according to the time division multiple access (TDMA) communication technique. Portions of the communication network 130 may also be implemented using various wide area networks, for example the Internet, and local area networks, for example, a wireless local area network (for example, Wi-Fi).

In some embodiments, each portable communication device 120 (also referred to as "communication device 120") represents a subscriber of the TDMA communication system 100. Each portable communication device 120 may belong to one or more talkgroups 140 that a user of the portable communication device 120 may switch between. A talkgroup 140 is a virtual radio channel on a digital radio system that enables communication between each portable communication device 120 of the talkgroup 140. As described herein, each portable communication device 120 or communication device 120 may also be referred to as a talkgroup "member." Each portable communication device 120 in a particular talkgroup 140 is assigned a talkgroup identifier, which allows the portable communication device 120 to send communications to the other portable communication devices 120 assigned the same talkgroup identifier. Each portable communication device 120 is also assigned a unique subscriber unit identifier (SUID), which, as described below, may be used to schedule transmission of status data from a particular portable communication device 120.

For example, as illustrated in FIG. 1, the portable communication devices 120A through 120M belong to talkgroup 140A and the portable communication devices 120N through 120Z belong to talkgroup 140B. In some situations, the portable communication devices 120 assigned to a particular talkgroup 140 may represent subscribers participating in an operation (for example, pursuing an object of interest or responding to an incident scene). Accordingly, during the operation, the talkgroup 140 allows users of the portable communication devices 120 assigned to talkgroup 140 to communicate via the communication network 130. A portable communication device 120 (and, thus, a user of a portable communication device 120) may be assigned to multiple talkgroups 140. As used herein, a talkgroup 140 may include a traditional static or dynamic talkgroup, an incident area network including multiple talkgroups and equipment used by members of a personal area network, and the like.

FIG. 1 illustrates only one example of a TDMA communication system, and, in some embodiments, the TDMA communication system 100 may include more or fewer components and may perform functions that are not explicitly described herein. In addition, although the call controller 110 is illustrated as communicating with all portable communication devices 120A through 120Z via a single communication network 130, the call controller 110 may communicate with the portable communication devices 120A through 120Z via multiple communication networks (constructed in accordance with various network protocols) and connections (for example, wired or wireless connections). Further, although the TDMA communication system 100 is shown as a centralized system, the TDMA communication system 100 may also be implemented as a decentralized system in which the functionality of the call controller 110 is accomplished within one or more of the portable communication devices 120 or on other controllers or servers (not shown).

Figure 2:
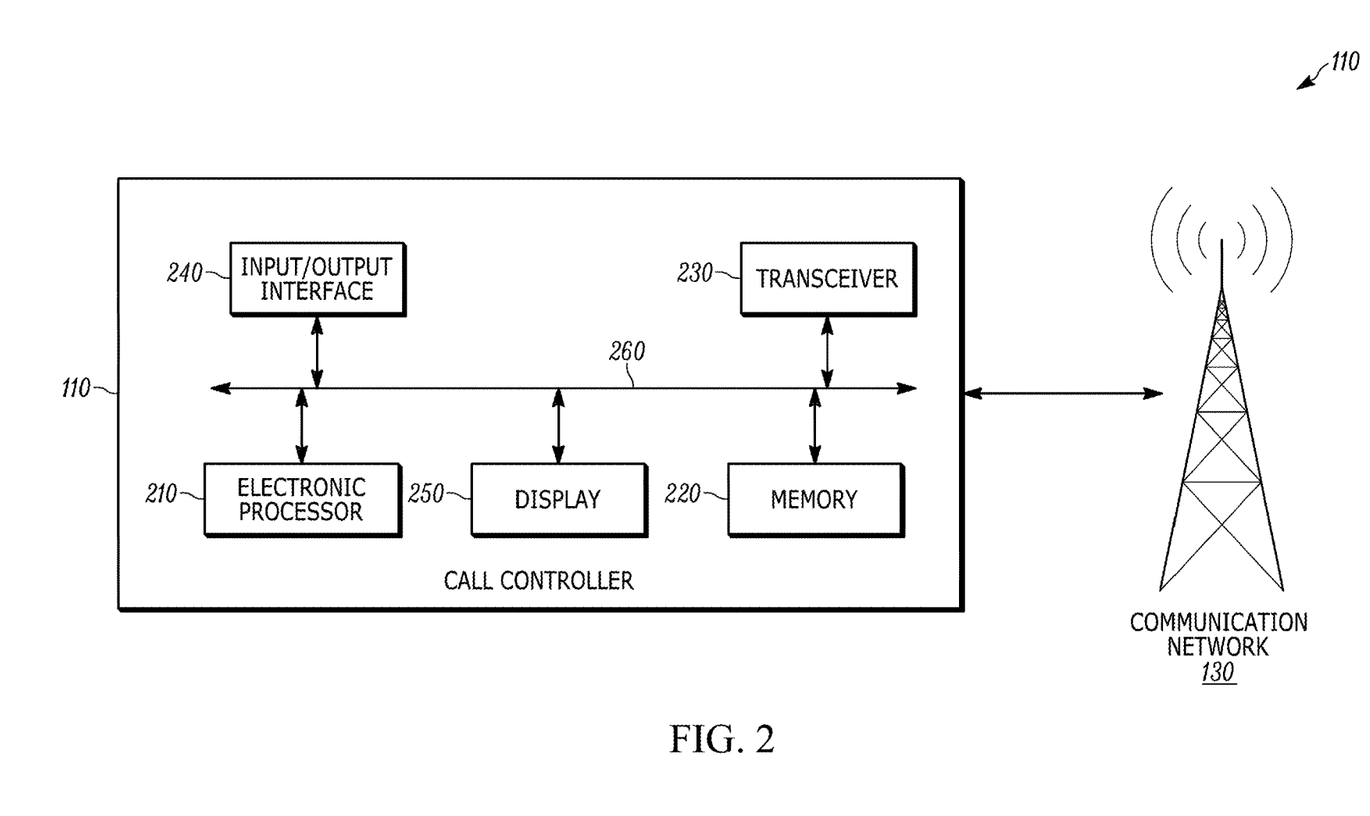
FIG. 2 is a diagram of a call controller included in the TDMA communication system of FIG. 1 in accordance with some embodiments.

FIG. 2 is a diagram of one embodiment of the call controller 110. As illustrated in FIG. 2, the call controller 110 includes an electronic processor 210, a memory 220, a transceiver 230, and input/output interface 240. The electronic processor 210, the memory 220, the transceiver 230, the input/output interface 240, and the display 250 may communicate over one or more buses (for example, a communication bus 260). FIG. 2 illustrates one example embodiment of a call controller 110. In other embodiments, the call controller 110 may include more or fewer components and may perform functions other than those explicitly described herein.

In some embodiments, the electronic processor 210 is implemented as a microprocessor with separate memory, such as the memory 220. In other embodiments, the electronic processor 210 may be implemented as a microcontroller (for example, with the memory 220 on the same chip). In other embodiments, the electronic processor 210 may be implemented using multiple processors. In addition, the electronic processor 210 may be implemented partially or entirely as, for example, a field-programmable gate array (FPGA), and application specific integrated circuit (ASIC), or other suitable processing device. In this instance, the memory 220 may not be needed or may be modified accordingly.

The memory 220 includes non-transitory, computer-readable memory that stores instructions that are received and executed by the electronic processor 210 to carry out functionality of the call controller 110 described herein. The memory 220 may include, for example, a program storage area and a data storage area. The program storage area and the data storage area may include combinations of different types of memory, such as read-only memory and random-access memory.

The transceiver 230 enables wireless communication from the call controller 110 to, for example, the portable communication devices 120A through 120Z via the communication network 130. In other embodiments, rather than the transceiver 230, the call controller 110 may include separate transmitting and receiving components, for example, a transmitter and a receiver. In other embodiments, the call controller 110 may not include a transceiver 230 and may communicate with the portable communication devices 120A through 120Z via a network interface and a wired connection to the communication network 130.

The input/output interface 240 may include one or more interfaces for communicating with input mechanisms (for example, a touch screen, a keypad, a button, a knob, and the like), one or more output mechanisms (for example, a display, a printer, a speaker, and the like), or a combination thereof. The input mechanisms and the output mechanisms may be included in the call controller 110 or separate or external to the call controller 110. For example, the input/output interface 240 may receive input from input devices actuated by a user and may provide output to output devices with which a user interacts. In some embodiments, as an alternative or in addition to managing inputs and outputs through the input/output interface 240, the call controller 110 may receive user input, provide user output, or both by communicating with an external device, such as a console computer, over a wired or wireless connection.

As illustrated in FIG. 2, an alternative to or in addition to communicating with an output mechanism, such as a display, through the input/output interface 240, the call controller 110 may include a display 250. The display 250 is a suitable display such as, for example, a liquid crystal display (LCD) screen. In some embodiments, the call controller 110 (the electronic processor 210) may generate a graphical user interface (GUI) that enables a user to interact with the call controller 110, which may be presented on the display 250.

Figure 3:
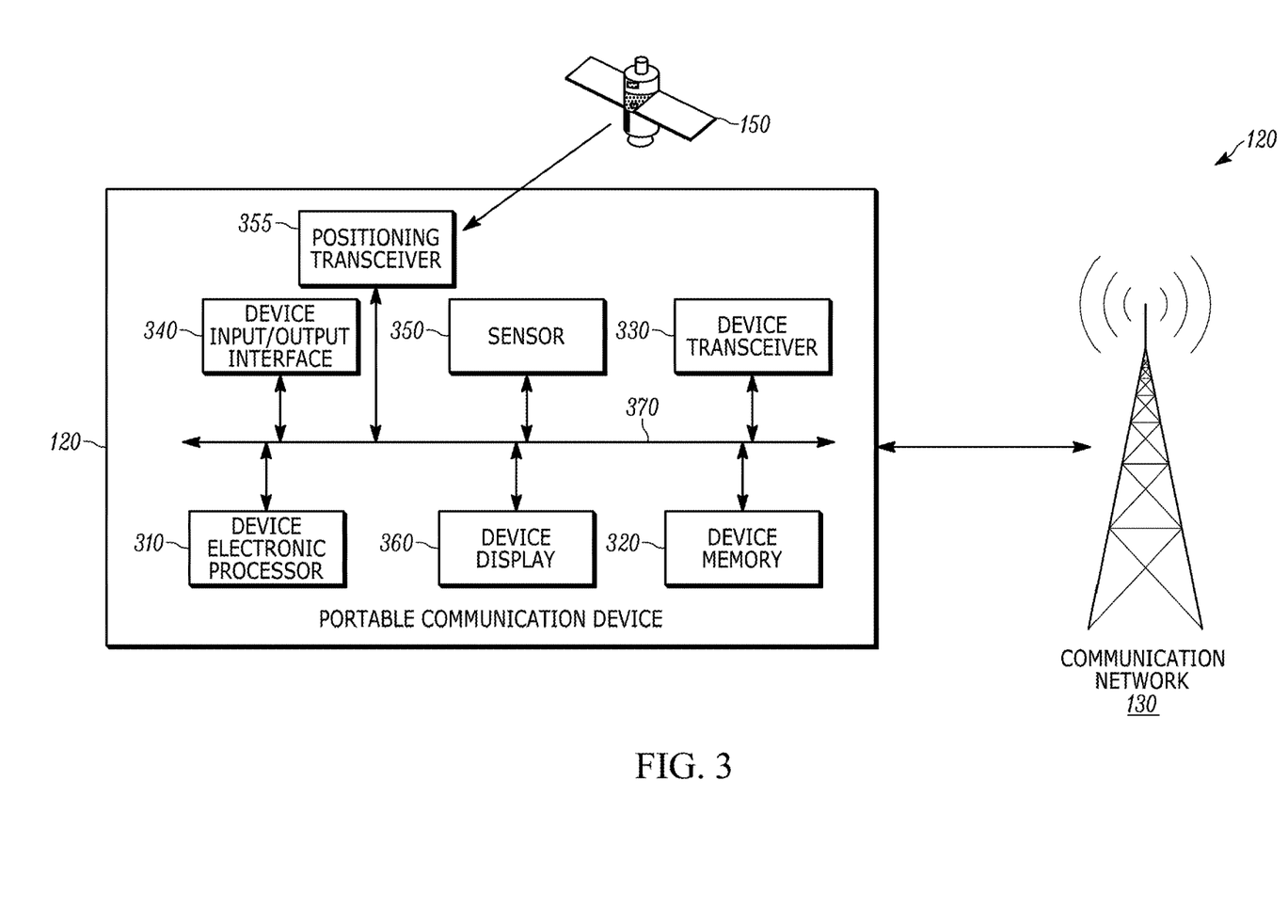
FIG. 3 is a diagram of a portable communication device included in the TDMA communication system of FIG. 1 in accordance with some embodiments.

FIG. 3 is a diagram of one embodiment of a portable communication device 120. As illustrated in FIG. 3, the portable communication device 120 includes a device electronic processor 310, a device memory 320, a device transceiver 330, and a device input/output interface 340. In some embodiments, the portable communication device 120 also includes a sensor 350, a positioning transceiver 355, a device display 360, or a combination thereof. The device electronic processor 310, the device memory 320, the device transceiver 330, the device input/output interface 340, the sensor 350, and the positioning transceiver 355 may communicate over one or more buses (for example, a device communication bus 370). FIG. 3 illustrates only one example of a portable communication device 120, and, in other embodiments, the portable communication device 120 may include more or fewer components than illustrated and may perform additional functions other than those described herein.

The device electronic processor 310 may be implemented in various ways including ways that are similar to those described above with respect to the electronic processor 210. Likewise, the device memory 320 may be implemented in various ways including ways that are similar to those described with the respect to the memory 220. The device memory 320 may store instructions that are received and executed by the device electronic processor 310 to carry out the functionality described herein.

The device transceiver 330 enables wireless communication from the portable communication device 120 to the call controller 110 and other portable communication devices via the communication network 130. In other embodiments, rather than a device transceiver 330, the portable communication device 120 may include separate transmitting and receiving components, for example, a transmitter and a receiver.

The device input/output interface 340 may include one or more interfaces for communicating with one or more input mechanisms (for example, a touch screen, a keypad, a button, a knob, and the like), one or more output mechanisms (for example, a display, a speaker, and the like), or a combination thereof. The input mechanisms and the output mechanisms may be included in the portable communication device 120 or may be external to the portable communication device 120. For example, in some embodiments, the portable communication device 120 communicates with one or more external devices through the device input/output interface 340 that may be part of a personal area network (PAN) of devices.

As illustrated in FIG. 3, an alternative to or in addition to communicating with an output mechanism, such as a display, through the device input/output interface 340, a portable communication device 120 may include the device display 360. The device display 360 is a suitable display such as, for example, a liquid crystal display (LCD) touch screen, or an organic light-emitting diode (OLED) touch screen. The portable communication device 120 (the device electronic processor 310) may generate a graphical user interface (GUI) that may be presented on the device display 360 to enable a user to interact the portable communication device 120. In some embodiments, the portable communication device 120 operates or is integrated with a head-mounted display (HMD) or an optical head-mounted display (OHMD).

The sensor 350 communicates detected data (sometimes referred to herein as sensor data) to the device electronic processor 310 via the device communication bus 370. In some embodiments, the sensor 350 is a health monitor for capturing vital signs of a person, such as the person carrying or associated with the portable communication device. The vital signs may include, for example, heart rate, blood pressure, temperature, blood oxygen, blood alcohol level, and the like. In other embodiments, the sensor 350 is an image sensor that is implemented, for example in an image capture device for capturing images, including still images, sequences of images (video), or both. The image capture device may sense light in at least the visible spectrum. Alternatively or in addition, the image capture device may sense infrared signals, such as a thermal camera, a night vision camera, and the like. In still other embodiments, the sensor 350 is a microphone for detecting audio signal, such as ambient audio signals. In yet other embodiments, the sensor 350 is a motion sensor for detecting movement, such as a speed sensor, an accelerator, or the like, that detects data representing the movement or orientation of the portable communication device 120 (and, consequently, a person or vehicle carrying the portable communication device 120). The sensor 350 may also include a presence sensor, such as a pressure sensor, a mechanism switch, or the like that detects the presence (or lack thereof) of a device, such as a holster sensor that detects whether a weapon or device carried in the holster has been removed or drawn.

In some examples, the sensor 350 is integrated into the portable communication device 120. In other examples, the sensor 350 is separate from the portable communication device 120, and communicates detected data to the portable communication device 120 via a wired or wireless connection. For example, the sensor 350 may be integrated into a body-worn health monitoring device, which communicates with the portable communication device 120. Also, in some embodiments, a portable communication device 120 may include multiple sensors 350 or may include a single sensor configured to detect multiple types of data, such as a sensor configured to detect audio data and image data.

The positioning transceiver 355 may include a positioning antenna and a dedicated positioning electronic processor. The positioning electronic processor receives satellite signals from a satellite 150, such as a satellite included in a global positioning system (GPS), through the positioning antenna and processes the received signals to determine a geographical location (one or more geographical coordinates) of the portable communication device 120. It should be understood that the positioning transceiver 355 may use a regional satellite navigation system, a land-based navigation system, or a combination thereof in conjunction with or in place of a GPS system. Also, in some embodiments, the positioning transceiver 355 may be located external to the portable communication device 120 and may provide a geographical location to the portable communication device 120 over a wired or wireless connection. Also, in some embodiments, the portable communication device 120 uses one or more different methods for detecting a location of the portable communication device 120 in addition to or as an alternative to using the positioning transceiver 355, such as measuring the strength of signals received by the portable communication device 120 from one or more sources with known locations, a Wi-Fi based positioning system (WPS), dead reckoning, or the like.

As noted above, when there is an active call, such as a voice call, within one of the talkgroups 140, the portable communication devices 120 included in the talkgroup 140 with the active call may not be able to provide status data, such as location data, to the call controller 110. Accordingly, the call controller 110 (or other devices or systems that rely on current status data for the portable communication devices 120) may not be able to accurately or efficiently perform particular functionality, such as device tracking or location-based dispatching.

Figure 4:
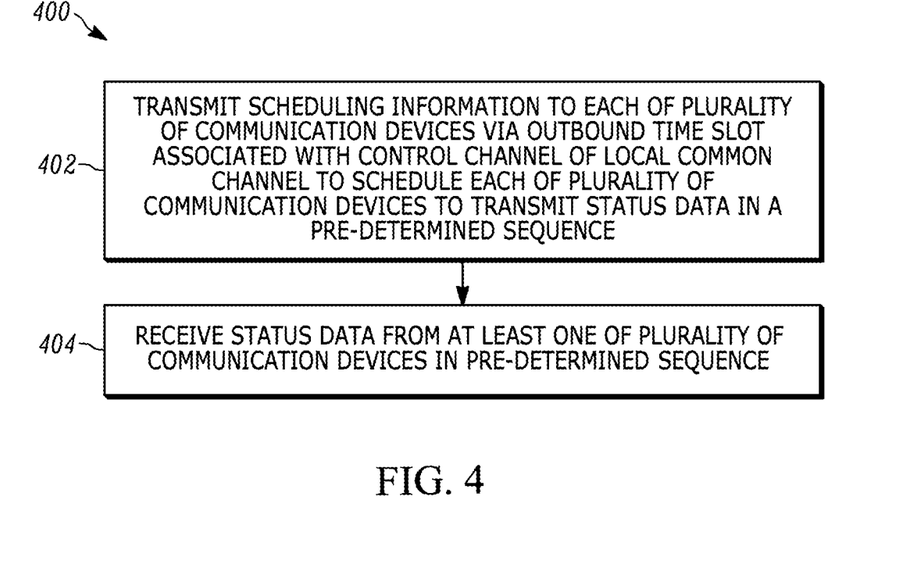
FIG. 4 is a flowchart of a method of scheduling transmitting of status data performed by the TDMA communication system of FIG. 1 in accordance with some embodiments.

To overcome this and other problems, the call controller 110 transmits scheduling information to members of a talkgroup that designate when (and how) a portable communication device 120 should transmit status data. For example, FIG. 4 is a flowchart of a method 400 of scheduling a status update performed by the TDMA communication system of FIG. 1 in accordance with some embodiments. The method 400 is described as being performed by the call controller 110 and, in particular, the electronic processor 210. However, it should be understood that the functionality illustrated in the method 400 may be distributed among multiple devices, such as multiple servers.

As illustrated in FIG. 4, the electronic processor 210 transmits scheduling information to each of a plurality of talkgroup members via an outbound time slot associated with a slow associated control channel (SACCH) of a local common TDMA channel to schedule the each of the plurality of talkgroup members to transmit status data in a pre-determined sequence (at block 402). In some embodiments, as described in more detail below, the scheduling information instructs each of the plurality of talkgroup members to transmit status data via the local common TDMA channel. Alternatively, in some embodiments, the scheduling information instructs each of the plurality of talkgroup members to transmit status data via a remote common channel, wherein the remote common channel is separate from the local common TDMA channel. For example, in some embodiments, the remote common channel is a remote common TDMA channel. In other embodiments, the remote common channel is a remote common frequency division multiple access (FDMA) channel.

As illustrated in FIG. 4, the electronic processor 210 subsequently receives the status data from at least one of the plurality of talkgroup members in the pre-determined sequence (at block 404). As described above, the status data includes data separate from the data being transmitted as part of the call (call data) and may include location data, such as a location determined by the positioning transceiver 355, sensor data detected by a health monitor, a camera, a motion sensor, a microphone, or other sensor, or the like. It should be understood that the status data may represent current data associated with a portable communication device 120, such as a current location, or historical status data associated with a portable communication device 120, such as sensor data collected during previous time period that has not yet been transmitted to the call controller.

Figure 5:
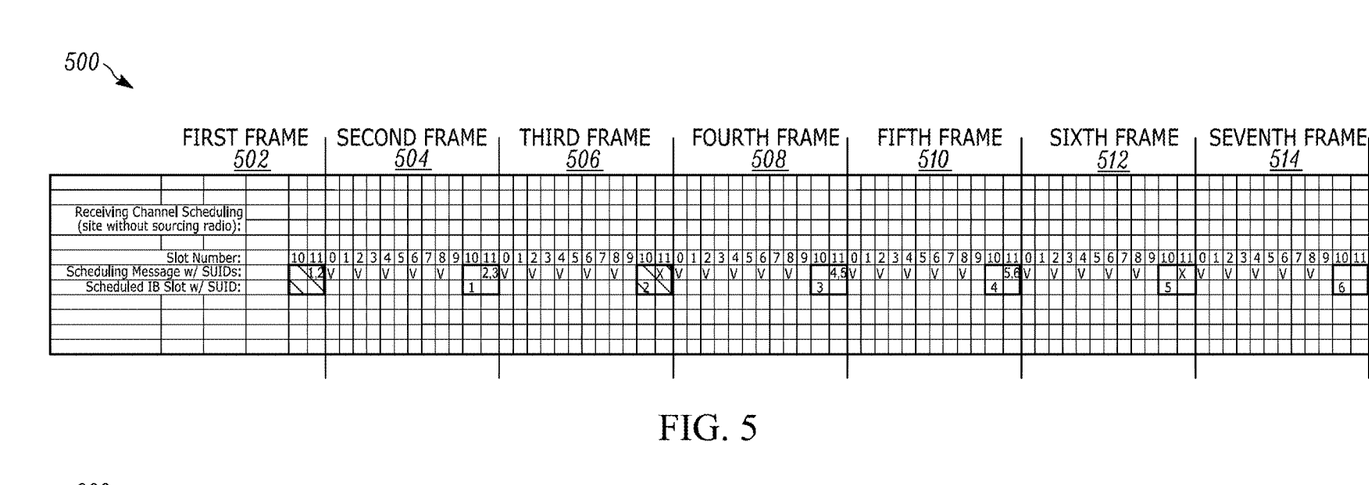
FIG. 5 is a diagram that illustrates in-call scheduling for a communication channel without inbound call data in accordance with some embodiments.

FIGS. 5 through 8 described below provide further details and alternatives for transmission of the scheduling information and the status data. For example, FIG. 5 illustrates in-call scheduling for a common channel 500 without inbound call data in accordance with some embodiments. As used herein, "in-call scheduling" includes scheduling performed by the call controller 110 for a talkgroup during an active call for the talkgroup. As illustrated in FIG. 5, when implementing TDMA, a common channel 500 is divided into a plurality of time slots. The common channel 500 may also be referred to herein as a "local common time division multiple (TDMA) channel."

As illustrated in FIG. 5, the common channel 500 includes a first frame 502, a second frame 504, a third frame 506, a fourth frame 508, a fifth frame 510, a sixth frame 512, and a seventh frame 514. Each frame of the common channel 500 is divided into twelve time slots (time slot 0 through time slot 11). The twelve time slots included in each frame are either outbound time slots (for example, time slots 0, 2, 4, 6, 8, and 11) or inbound time slots (for example, time slots 1, 3, 5, 7, 9, and 10). For the example illustrated in FIG. 5, the slow associated control channel (SACCH) as defined by the TDMA communication technique is associated with outbound time slot 11 and inbound time slot 10, but, in other embodiments, different time slots may be associated with the SACCH.

The call controller 110 uses the outbound time slot 11 to transmit the scheduling information as described above with respect to FIG. 4. The scheduling information specifies a talkgroup member to transmit status data on a future time slot not including call data (for example, the inbound time slot 10 associated with SACCH as defined by the TDMA communication technique, which is sometimes referred to as transmitting location time slot or "TLTS"). For example, during the outbound time slot 11, the call controller 110 may transmit a subscriber unit identifier that is assigned to one of the plurality of portable communication devices 120 included in a talkgroup 140 (referred to hereinafter as "talkgroup member with SUID #"). In some embodiments, the call controller 110 transmits the scheduling information during the outbound time slot 11 in a round-robin fashion among talkgroup members unless higher priority information (for example, high priority messages, aliases, group text, or other suitable high priority information) preempts the scheduling information.

In some embodiments, the outbound time slot 11 does not include any information until the call controller 110 uses the outbound time slot 11 to transmit the scheduling information. In other embodiments, the outbound time slot 11 includes other information (for example, power control information, timing information, or a combination thereof), and the call controller 110 uses the outbound time slot 11 to transmit the scheduling information in addition to the other information. In yet other embodiments, the call controller 110 uses the outbound time slot 11 to transmit the scheduling information in place of the other information.

For example, as illustrated in FIG. 5, in the first frame 502, the call controller 110 transmits scheduling information for talkgroup members with SUIDs 1 and 2 during the outbound time slot 11. Similarly, in the second frame 504, the call controller 110 transmits scheduling information for talkgroup members with SUIDs 2 and 3 during the outbound time slot 11. In the third frame 506, the call controller 110 transmits higher priority information during the outbound time slot 11 (represented by an "X") that preempts the scheduling information. In the fourth frame 508, the call controller 110 transmits scheduling information for talkgroup members with SUIDs 4 and 5 during the outbound time slot 11. In the fifth frame 510, the call controller 110 transmits scheduling information for talkgroup members with SUIDs 5 and 6 during the outbound time slot 11. In the sixth frame 512, the call controller 110 transmits additional higher priority information during the outbound time slot 11 (represented by an "X") that preempts the scheduling information.

In the example of FIG. 5, the call controller 110 transmits scheduling information for two talkgroup members during the outbound time slot 11 for redundancy, wherein only one of the identifier talkgroup members may be scheduled to transmit at a time. For example, when the call controller 110 transmits scheduling for more than one talkgroup member during time slot 11 for the next two TLTS, only the first identified member may transmit at the next available inbound time slot 10 as described below (and the subsequently-identified members may prepare for subsequent transmission). However, in other embodiments, the call controller 110 transmits scheduling information for more or less than two talkgroup members during the outbound time slot 11.

As illustrated in FIG. 5, in the second frame 504, the call controller 110 receives status data (for example, location data, sensor data, or the like) transmitted by the talkgroup member with SUID 1 during the inbound time slot 10. In the third frame 506, the call controller 110 receives status data transmitted by the talkgroup member with SUID 2 during the inbound time slot 10. In the fourth frame 508, the call controller 110 may again receive status data transmitted by the talkgroup member with SUID 3 during the inbound time slot 10 because the call controller 110 previously transmitted the schedule information for the SUID 3 during outbound time slot 11 of the second frame 504. In the fifth frame 510, the call controller 110 receives status data transmitted by the talkgroup member with SUID 4 during the inbound time slot 10. In the sixth frame 512, the call controller 110 receives status data transmitted by the talkgroup member with SUID 5 during the inbound time slot 10, and, in the seventh frame 514, the call controller 110 may again receive status data transmitted by the talkgroup member with SUID 6 during the inbound time slot 10 because the call controller 110 previously transmitted the schedule information for the SUID 6 during the outbound time slot 11 of the fifth frame 510.

In some embodiments, the inbound time slot 10 will not include any information until the call controller 110 uses the scheduling information to receive the status data during the inbound time slot 10. In other embodiments, the inbound time slot 10 will include other information (for example, power control information, timing information, or a combination thereof), and the call controller 110 uses the scheduling information to receive the status data in addition to the other information during the inbound time slot 10. In yet other embodiments, the call controller 110 uses the scheduling information to receive the status data in place of the other information during the inbound time slot 10.

In some embodiments, a talkgroup 140 may include a relatively small number of members, for example, six talkgroup members. In this situation, the call controller 110 may repeat the in-call scheduling as described above to continuously receive status data without impacting audio between the call controller 110 and the six talkgroup members until the end of the call. In other embodiments, the talkgroup 140A may include, for example, M talkgroup members, where M is a positive integer. In some embodiments, M talkgroup members may be a range of one to four hundred and fifty members. In this situation, the call controller 110 may apply in-call scheduling as described above to the M talkgroup members to continuously receive status updates from all of the M talkgroup members without impacting audio between the call controller 110 and the M talkgroup members. M talkgroup members that did not get scheduled by the end of the call can be prioritized over scheduled members for the next call. M talkgroup members of a talkgroup call may be spread over multiple sites, and within each site a common channel is assigned for the call. Each assigned common channel is responsible for scheduling talkgroup within that site.

In the example of FIG. 5, the common channel 500 does not have any call data on inbound time slots 1, 3, 5, 7, and 9 because none of the talkgroup members of the talkgroup 140A are sourcing call data to the call controller 110 via the common channel 500. In this instance, a TLTS is available each frame at inbound time slot 10 (for instance, once every three hundred and sixty milliseconds (ms)). Accordingly, when a talkgroup 140 has an eighty-three member talkgroup call (and all the members share the same common channel), the cadence for each talkgroup member of the talkgroup 140 may be eighty-three multiplied by three hundred and sixty milliseconds, which is approximately 29.9 seconds.

Figure 6:
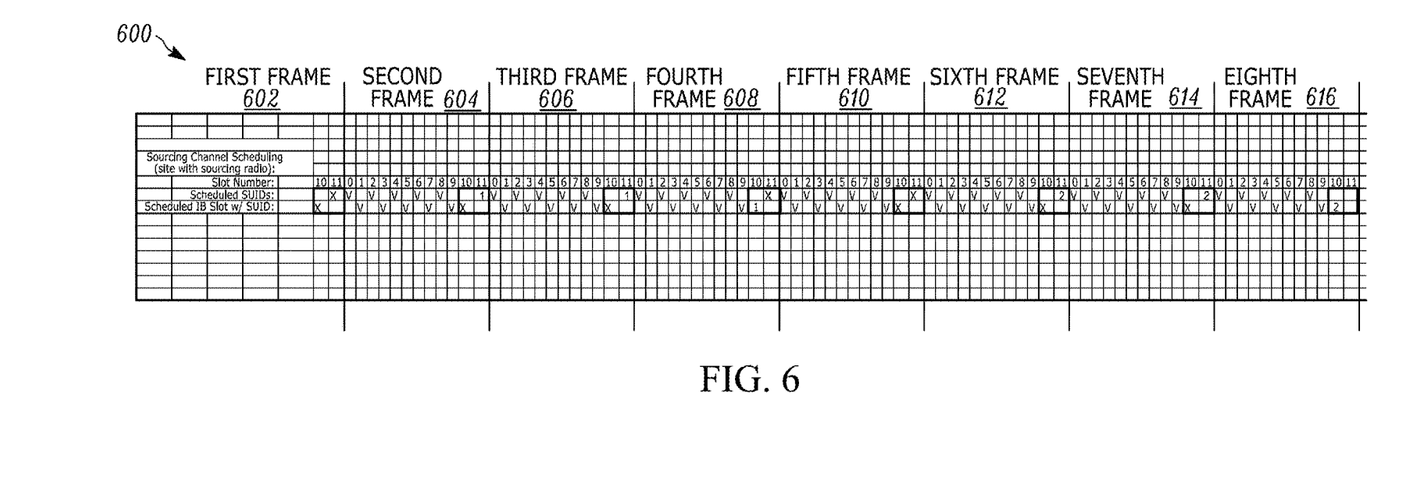
FIG. 6 is a diagram that illustrates in-call scheduling for a communication channel with inbound call data in accordance with some embodiments.

Similar to FIG. 5, FIG. 6 illustrates in-call scheduling for a common channel 600 with inbound call data in accordance with some embodiments. In this example, the common channel 600 may also be referred to as a "local common time division multiple (TDMA) channel." As illustrated in FIG.

6, the common channel 600 has a similar structure as the common channel 500 described above with respect to FIG. 5. Therefore, as a consequence, the redundant description of the common channel 600 is not provided.

As illustrated in FIG. 6, in a first frame 602, the call controller 110 transmits higher priority information during the outbound time slot 11 (represented by an "X") that preempts the scheduling information. In a second frame 604, the call controller 110 transmits scheduling information for a talkgroup member with SUID 1 during the outbound time slot 11. For redundancy, in a third frame 606, the call controller 110 again transmits scheduling information for the talkgroup member with SUID 1 during the outbound time slot 11. In a fourth frame 608 and a fifth frame 610, the call controller 110 transmits higher priority information during the outbound time slots 11 (represented by an "X") that preempts the scheduling information. In a sixth frame 612, the call controller 110 transmits scheduling information a talkgroup member with SUID 2 during the outbound time slot 11. For redundancy, in a seventh frame 614, the call controller 110 again transmits scheduling information the talkgroup member with SUID 2 during the outbound time slot 11.

In the example of FIG. 6, for redundancy, the call controller 110 transmits scheduling information for the talkgroup member with the same SUID during the outbound time slot 11 of two different frames. However, in other embodiments, the call controller 110 transmits scheduling information for more than one talkgroup member during the outbound time slot 11 of each frame (for example, see description of SUID redundancy with respect to FIG. 5).

As illustrated in FIG. 6, in the fourth frame 608, the call controller 110 receives status data (for example, location data) transmitted by the talkgroup member with SUID 1 during an inbound time slot 10 because the inbound time slot 10 is not available in the third frame 606. In the eighth frame 616, the call controller 110 receives status data transmitted by the talkgroup member with SUID 2 during the inbound time slot 10 because the inbound time slot 10 is not available in the seventh frame 614. In some embodiments, the higher priority information includes a sourcing subscriber unit identification message, which preempts the status data transmitted by the talkgroup member with SUID 1 during the inbound time slot 10 of the third frame 606 and the talkgroup member with SUID 2 during the inbound time slot 10 of the seventh frame 614.

In some embodiments, when a talkgroup 140 includes six talkgroup members, the call controller 110 may repeat the in-call scheduling as described above to continuously receive status data from all six talkgroup members without impacting audio between the call controller 110 and the six talkgroup members until the end of the call. In other embodiments, a talkgroup 140 may have M talkgroup members, where M is a positive integer. For example, M talkgroup members may be range of one to four hundred and fifty members. In this situation, the call controller 110 may apply the in-call scheduling as described above to the M talkgroup members to continuously receive status data from all of the M talkgroup members without impacting audio between the call controller 110 and the M talkgroup members.

In the example of FIG. 6, the common channel 600 has call data on inbound time slots 1, 3, 5, 6, and 9, because one of the talkgroup members of the talkgroup 140A is sourcing call data to the call controller 110. In this situation, a TLTS is available only once every four frames or each "ultra-frame" (for instance, once every one thousand four hundred and forty milliseconds (ms)). Accordingly, when a talkgroup 140 has a twenty member talkgroup call (and all the members share the same common channel), the cadence for each talkgroup member of the talkgroup 140 may be twenty multiplied by one thousand four hundred and forty milliseconds, which is 28.8 seconds.

Figure 7:
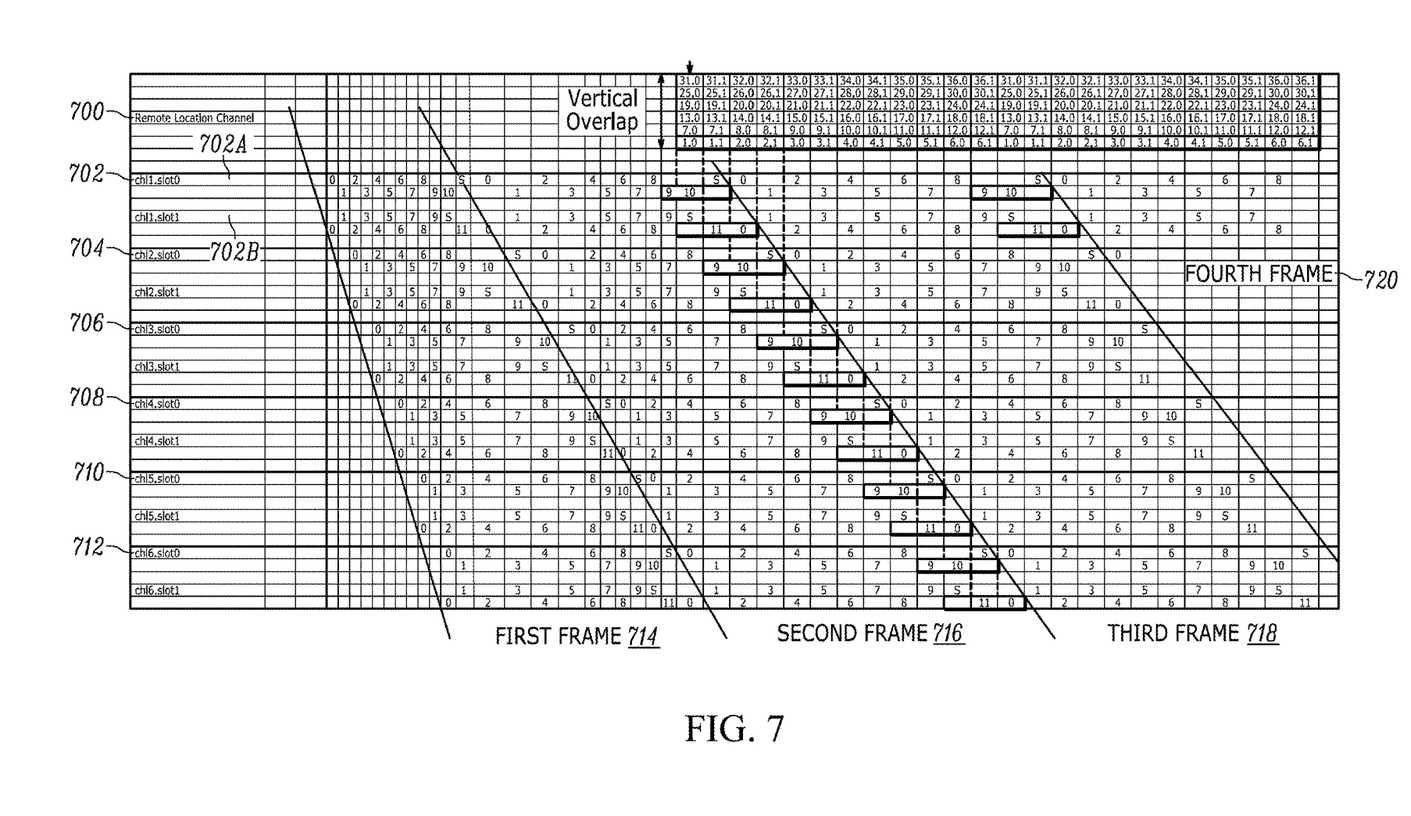
FIG. 7 is a diagram that illustrates remote-channel scheduling for a remote channel for a plurality of communication channels in accordance with some embodiments.

As noted above, in some embodiments, the scheduling information transmitted by the call controller 110 may instruct talkgroup members to transmit status data on a remote channel rather than the common channel providing the scheduling information. FIG. 7 illustrates remote-channel scheduling for a remote channel 700 for a plurality of six common channels 702 through 712 in accordance with some embodiments. As illustrated in FIG. 7, each of the six common channels 702 through 712 is divided into two logical channels, and each of the plurality of logical channels are further divided into a plurality of time slots as described above with respect to FIG. 5. Each of the plurality of six common channels 702 through 712 may also be referred to herein as a "local common time division multiple (TDMA) channel."

In the example of FIG. 7, each of the plurality of logical channels is divided into twelve time slots (time slot 0 through time slot 11) that collectively form a single "frame." For example, in the illustrated example, the plurality of common channels 702 through 712 are divided into a first frame 714, a second frame 716, a third frame 718, and a fourth frame 720. The twelve time slots of each frame are either outbound time slots or inbound time slots.

For ease of understanding, a first logical channel 702A and a second logical channel 702B of a first common channel 702 will be described below. For example, as illustrated in FIG. 7, the first logical channel 702A of the first physical channel 702 may also be referred to as 1.0 (PhysicalChannel.LogicalChannel) and the second logical channel 702B of the first physical channel 702 may also be referred to as 1.1. However, the description below with respect the first and second logical channels 702A and 702B is also applicable to the other logical channels of the common channels 704 through 712.

As illustrated in FIG. 7, the first logical channel 702A of the first common channel 702 has outbound time slots 0, 2, 4, 6, 8, and 11 and inbound time slots 1, 3, 5, 7, 9, and 10. The outbound time slot 11 and the inbound time slot 10 of the first logical channel 702A are each associated with the slow associated control channel (SACCH) as described above with respect to FIG. 5.

Additionally, as illustrated in FIG. 7, the second logical channel 702B of the first common channel 702 has outbound time slots 1, 3, 5, 7, 9, and 10 and inbound time slots 0, 2, 4, 6, 8, and 11. The outbound time slot 10 and the inbound time slot 11 of the second logical channel 702B are each associated with the slow associated control channel (SACCH) as described above with respect to FIG. 5.

The call controller 110 uses the remote-channel scheduling to transmit scheduling information for one or more talkgroup members with a corresponding one or more subscriber unit identifiers during the outbound time slot 11 of the first logical channel 702A unless higher priority information preempts the scheduling information. The scheduling information controls a talkgroup member of the one or more talkgroup members to transmit status data during a first time slot (for example, a remote inbound time slot) of the remote channel 700 (for example, a separate TDMA channel) that is synchronized with the inbound time slot 10 of the first logical channel 702A in the second frame 716.

Similarly, the call controller 110 uses the remote-channel scheduling to transmit scheduling information for a second set of one or more talkgroup members with a corresponding one or more subscriber unit identifiers during the outbound time slot 10 of the second logical channel 702B unless higher priority information preempts the scheduling information. The scheduling information controls a talkgroup member of the one or more talkgroup members to transmit status data during a first time slot of the remote channel 700 (for example, a separate TDMA channel) that is synchronized with the inbound time slot 11 of the second logical channel 702B in the second frame 716.

For example, as illustrated in FIG. 7, in the second frame 716, the call controller 110 receives status data (for example, location data, sensor data, or the like) from the talkgroup member with the highest priority. For instance, when the talkgroup member with SUID from talkgroup call on the first logical channel 702A is a high priority, the call controller 110 receives the status data transmitted by the talkgroup member with that SUID via the first time slot of the remote channel 700 that is synchronized with the inbound time slot 10 of the first logical channel 702A in the second frame 716. Similarly, when the talkgroup member with a second SUID from talkgroup call on the second logical channel 702B is a high priority, the call controller 110 receives status data transmitted by the talkgroup member with the second SUID via the second time slot of the remote channel 700 that is synchronized with the inbound time slot 11 of the second logical channel 702B in the second frame 716.

The remote-channel scheduling for the first and second logical channels 702A and 702B (for example, logical channels 1.0 and 1.1) as described above is similarly applied for the remaining talkgroup members (for example, talkgroup members from the other logical channels 7.0, 7.1, 13.0, 13.1, 19.0, 19.1, 25.0, 25.1, 31.0, and 31.1). The call controller 110 may repeat the remote-channel scheduling by starting again with the highest priority SUIDs (for example, talkgroup members from the first logical channel 702A and the second logical channel 702B) to continuously receive status updates from all of the talkgroup members.

The remote-channel scheduling as described above allows a plurality of talkgroup members in different talkgroups and on different active calls to share the remote channel. By sharing the remote channel and receiving the scheduling information from the call controller 110, each of the talkgroup members may transmit status data via the remote channel without collision.

As illustrated in FIG. 7, the remote-channel scheduling is performed with the six common channels 702 through 712, which are offset from each other. In some embodiments, the call controller 110 may offset each of the six common channels 702 through 712 using Equation 1 as defined below, when the outbound and inbound time slots associated with the SACCH are the same for each of the six common channels 702 through 712.

Channel Offset=2*Mod(Channel Number,Number of Slots in a Frame/Number of Common Channels per Physical Channel)      (1)

In the example of FIG. 7, the channel number of the first common channel 702 of the six common channels 702 through 712 is equal to one, the number of slots in a frame is equal to twelve, and the number of common channels per physical channel is equal to two. Thus, the channel offset of the first common channel 702 according to Equation 1 is two time slots. Likewise, the channel number of the fifth common channel 710 is equal to five, the number of slots in a frame is equal to twelve, and the number of common channels per physical channel is equal to two and the channel offset of the fifth common channel 710 according to Equation 1 is ten time slots. As illustrated in FIG. 7, the first common channel 702 and the fifth common channel 710 are offset from each other by eight time slots.

When there are greater than six common channels (for example, up to seventy-two common channels) in a site, multiple common channels may have the same offset based on Equation 1, meaning the position of the SACCHs are aligned with each other and overlap over the same time slot on the remote channel 700. Since the same time slot on the remote channel 700 is shared among the talkgroup calls, there is a need to first schedule which talkgroup among the talkgroup calls may use the shared time slot. One way to prioritize is to use the size of talkgroup members as a priority preference weight.

In some embodiments, each of the six common channels 702 through 712 has a talkgroup with a relatively small members, for example, six members, the call controller 110 may repeat the remote-channel scheduling as described above to continuously receive status data from all seventy-two talkgroup members without impacting audio between the call controller 110 and the seventy-two talkgroup members until the end of each call accordingly.

In other embodiments, N common channels each have a talkgroup with M talkgroup members, N and M being a positive integer. The call controller 110 may apply the remote-channel scheduling as described above to the N channels to continuously receive status data from all N*M talkgroup members without impacting audio between the call controller 110 and the N*M talkgroup members until the end of each call accordingly.

In the example of FIG. 7, when inbound time slots of the logical channels of the six common channels 702 through 712 do not have call data, a TLTS is available each frame at inbound time slots 10 and 11 (for instance, once every three hundred and sixty milliseconds (ms)) on the local channel and the remote channel 700. Accordingly, for the seventy-two talkgroup members, the cadence for each talkgroup member may be six divided by roughly 5.6 microseconds (p), which is approximately 1.08 seconds.

Alternatively, in the example of FIG. 7, when inbound time slots of the six common channels have call data, a TLTS is available each ultraframe at inbound time slots 10 and 11 (for instance, once every one thousand four hundred and forty milliseconds (ms)) on the local channel and once every three hundred and sixty milliseconds (ms) on the remote channel 700. Accordingly, for the seventy-two talkgroup members, the cadence for each talkgroup member may be six divided by roughly 3.47 microseconds (p), which is approximately 1.73 seconds.

In some embodiments, more than one remote channel 700 may be used if a higher cadence is desired. Alternatively, in some embodiments, a position of the outbound time slot associated with SACCH on each common channel may be used to schedule a "local" (for example, the local common TDMA channel) and/or a "remote" (for example, on the remote channel 700) status data that corresponds to the upcoming position of the inbound time slot associated with SACCH. In yet other embodiments, talkgroups may overlap (for example, a "vertical overlap") within one remote channel (for example, the remote channel 700). In this instance, a first layer of scheduling is for talkgroups among overlapping channels, and a second layer of scheduling is for the members within the selected talkgroup.

Figure 8:
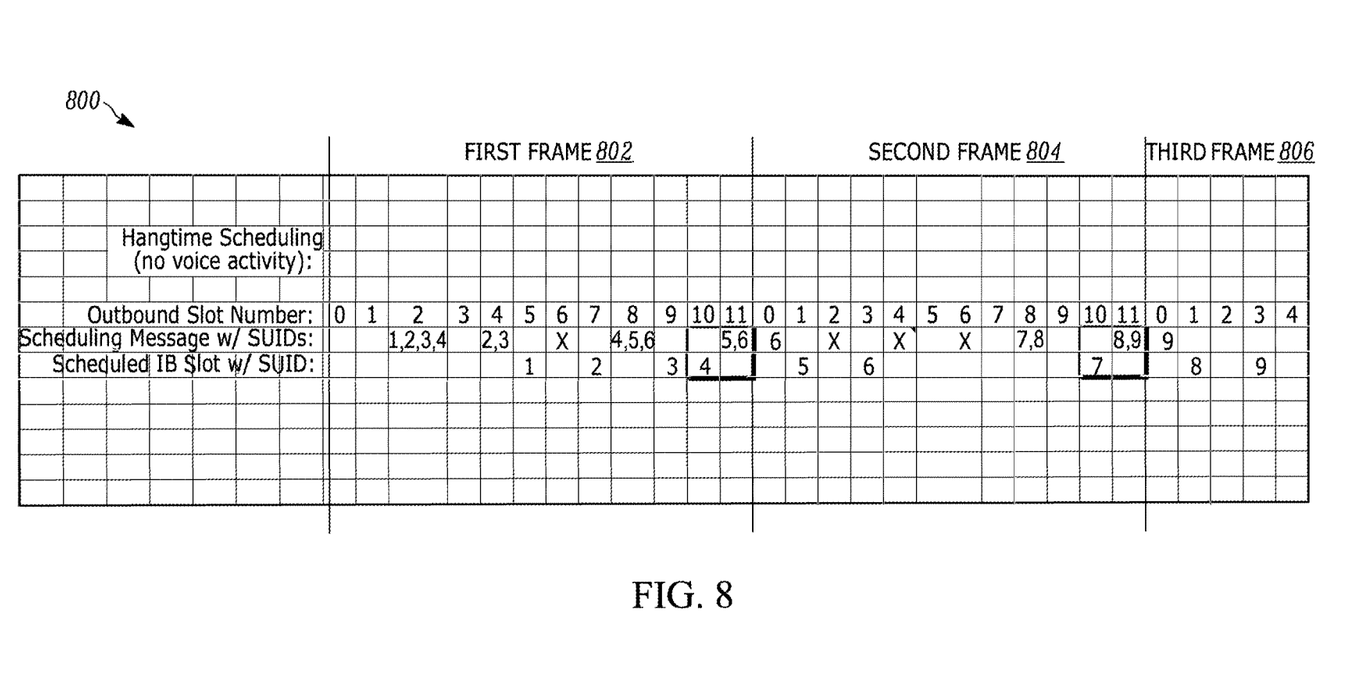
FIG. 8 is a diagram that illustrates hang-time scheduling for a communication channel without inbound call data and outbound call data in accordance with some embodiments.

FIG. 8 also illustrates hang-time scheduling for a common channel 800 without inbound call data and without outbound call data in accordance with some embodiments. As used herein, "hang-time scheduling" refers to scheduling occurring during hang time experienced by a talkgroup call. The hang-time scheduling may occur after in-call scheduling as described above with respect to FIGS. 5 and 6 or after remote-channel scheduling as described above with respect to FIG. 7. The common channel 800 may also be referred to as a "local common time division multiple (TDMA) channel." In this instance, the "common" aspect of the common channel 800 refers to the to the talkgroup members of the talkgroup call that are scheduled to use the inbound time slots. The common channel 800 is common amongst the talkgroup members, but is not common across channels or talkgroups.

As illustrated in FIG. 8, the common channel 800 is divided into a plurality of time slots as described above with respect to FIG. 5. In particular, the common channel 800 is divided into twelve time slots (time slot 0 through time slot 11) that collectively form a single "frame." Accordingly, in the illustrated example, the common channel 800 includes a first frame 802, a second frame 804, and part of a third frame 806. The twelve time slots of each frame are either outbound time slots (time slots 0, 2, 4, 6, 8, and 11) or inbound time slots (time slots 1, 3, 5, 7, 9, and 10). In the example of FIG. 8, the slow associated control channel (SACCH) is associated with outbound time slot 11 and inbound time slot 10.

The call controller 110 uses hang-time scheduling to transmit scheduling information for talkgroup members with subscriber unit identifiers (SUIDs) into any of the outbound time slots unless higher priority information preempts the scheduling information. The scheduling information transmitted during the outbound time slots 2, 4, 6, 8, and 11 controls the talkgroup members with the corresponding SUIDs to transmit status data at the future time slot (forward scheduling) without call data (referred to as transmitting location time slot (TLTS) described in greater detail above).

As illustrated in FIG. 8, in the first frame 802 of the common channel 800, the call controller 110 transmits scheduling information for talkgroup members with SUIDs 1 through 4 during the outbound time slot 2. In the first frame 802, the call controller 110 transmits scheduling information for talkgroup members with SUIDs 2 and 3 during the outbound time slot 4. In the first frame 802, the call controller 110 transmits higher priority information during the outbound time slot 6 (represented by an "X") that preempts the scheduling information. In the first frame 802, the call controller 110 transmits scheduling information for talkgroup members with SUIDs 4 through 6 during the outbound time slot 8. Similarly, in the first frame 802, the call controller 110 transmits scheduling information for talkgroup members with SUIDs 5 and 6 during the outbound time slot 11.

In the second frame 804 of the common channel 800, the call controller 110 transmits scheduling information for talkgroup members with SUID 6 during the outbound time slot 0. In the second frame 804, the call controller 110 transmits high priority information during the outbound time slots 2, 4, and 6 (represented by an "X") that preempts the scheduling information. In the second frame 804, the call controller 110 transmits scheduling information for talkgroup members with SUIDs 7 and 8 during the outbound time slot 8. In the second frame 804, the call controller 110 transmits scheduling information for talkgroup members with SUIDs 8 and 9 during the outbound time slot 11. Similarly, in the third frame 806, the call controller 110 transmits scheduling information for talkgroup members with SUID 9 during the outbound time slot 0.

As illustrated in FIG. 8, in the first frame 802, the call controller 110 receives status data transmitted by the talkgroup member with SUID 1 during the inbound time slot 5. In the first frame 802, the call controller 110 receives status data transmitted by the talkgroup member with SUID 2 during the inbound time slot 7. In the first frame 802, the call controller 110 again receives status data transmitted by the talkgroup member with SUID 3 during the inbound time slot 9 because the call controller 110 previously transmitted the schedule information for talkgroup members with SUIDs 2 and 3 during the outbound time slots 2 and 4. Similarly, in the first frame 802, the call controller 110 receives status data transmitted by the talkgroup member with SUID 4 during the inbound time slot 10.

As illustrated in FIG. 8, in the second frame 804, the call controller 110 receives status data transmitted by the talkgroup member with SUID 5 during the inbound time slot 1. In the second frame 804, the call controller 110 again receives status data transmitted by the talkgroup member with SUID 6 during the inbound time slot 3 because the call controller 110 previously transmitted the scheduling information for the talkgroup member with SUID 6 during the outbound time slot 11 of the first frame 802 and during the outbound time slot 0 of the second frame 804. Similarly, in the second frame 804, the call controller 110 receives status data transmitted by the talkgroup member with SUID 7 during the inbound time slot 10.

As illustrated in FIG. 8, in the third frame 806, the call controller 110 receives status data transmitted by the talkgroup member with SUID 8 during the inbound time slot 1, and, in the third frame 806, the call controller 110 receives status data transmitted by the talkgroup member with SUID 9 during the inbound time slot 3.

In the example of FIG. 8, the common channel 800 does not have any call data on inbound time slots or outbound time slots. In this instance, a TLTS is available at every time slot for the talkgroup call (for instance, once every thirty milliseconds or once every sixty milliseconds (ms)), unless high priority information preempts the scheduling information.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for scheduling transmission of status data from each of a plurality of communication devices in a time division multiple access (TDMA) communication system, the method comprising:

transmitting, with a call controller, scheduling information to the each of the plurality of communication devices via an outbound time slot associated with a control channel of a local common TDMA channel to schedule the each of the plurality of communication devices to transmit the status data in a pre-determined sequence via a remote common channel, wherein the remote common channel is separate from the local common TDMA channel; and receiving the status data from at least one of the plurality of communication devices in the pre-determined sequence via a remote inbound time slot of the remote common channel that is synchronized with an inbound time slot of the local common TDMA channel.

2. The method of claim 1, wherein the control channel is a slow associated control channel (SACCH).

3. The method of claim 1, wherein the status data includes location data.

4. The method of claim 1, wherein the status data includes sensor data.

5. The method of claim 1, further comprising:

transmitting, with the call controller, in-call scheduling information to the each of the plurality of communication devices via the outbound time slot of the local common TDMA channel to schedule the each of the plurality of communication devices to transmit the status data in the pre-determined sequence via the remote common channel and the local common TDMA channel; and receiving the status data from the at least one of the plurality of communication devices in the pre-determined sequence via a second inbound time slot associated with the control channel of the local common TDMA channel.

6. The method of claim 1, further comprising:

transmitting, with the call controller, hang-time scheduling information to the each of the plurality of communication devices via the outbound time slot of the local common TDMA channel to schedule the each of the plurality of communication devices to transmit the status data in the pre-determined sequence via the remote common channel and the local common TDMA channel; and receiving the status data from the at least one of the plurality of communication devices in the pre-determined sequence via a second inbound time slot of the local common TDMA channel.

7. The method of claim 1, further comprising:

receiving, with the call controller, call data via the local common TDMA channel, wherein the pre-determined sequence includes each ultraframe of the local common TDMA channel.

8. The method of claim 1, further comprising:

not receiving, with the call controller, call data via the local common TDMA channel, wherein the pre-determined sequence includes each frame of the local common TDMA channel.

9. A method for scheduling transmission of status data from each of a plurality of communication devices in a time division multiple access (TDMA) communication system, the method comprising:
   transmitting, with a call controller, scheduling information to the each of the plurality of communication devices via an outbound time slot associated with a control channel of a local common TDMA channel to schedule the each of the plurality of communication devices to transmit the status data in a pre-determined sequence;
   receiving the status data from at least one of the plurality of communication devices in the pre-determined sequence; and
   transmitting, with the call controller, adjusted scheduling information to the each of the plurality of communication devices via the outbound time slot associated with the control channel of the local common TDMA channel to schedule the each of the plurality of communication devices to transmit the status data in a second pre-determined sequence in response to not receiving the status data from the each of the plurality of communication devices in the pre-determined sequence, the second pre-determined sequence being different than the pre-determined sequence.

10. A portable communication device comprising:
   communication circuitry configured to communicate with a call controller; and
   an electronic processor communicatively connected to the communication circuitry, the electronic processor configured to
      receive scheduling information from the call controller via an outbound time slot associated with a control channel of a local common time division multiple access (TDMA) channel; and
      transmit status data during an inbound time slot based on the scheduling information received from the call controller; and
   a positioning transceiver,
      wherein the status data includes location data determined by the positioning transceiver.

11. The portable communication device of claim 10, wherein the control channel is a slow associated control channel (SACCH).

12. The portable communication device of claim 10, further comprising a sensor and wherein the status data includes data detected by the sensor.

13. The portable communication device of claim 12, wherein the sensor includes at least one selected from a group consisting of an image sensor, a health monitor, a motion sensor, a holster sensor, and a microphone.

14. The portable communication device of claim 10, wherein the scheduling information is in-call scheduling information and wherein the electronic processor is configured to transmit the status data by transmitting the status data via an inbound time slot associated with the control channel of the local common TDMA channel.

15. The portable communication device of claim 10, wherein the electronic processor is further configured to receive hang-time scheduling information from the call controller via a second outbound time slot of the local common TDMA channel, and wherein the electronic processor is further configured to transmit the status data by transmitting the status data via an inbound time slot of the local common TDMA channel.

16. A time division multiple access (TDMA) communication system comprising:
   a call controller including
      an electronic processor configured to
         transmit scheduling information to each of a plurality of communication devices via an outbound time slot associated with a control channel of a local common TDMA channel to schedule the each of the plurality of communication devices to transmit status data in a pre-determined sequence, and
         receive the status data from at least one of the plurality of communication devices in the pre-determined sequence, and
   wherein one of the plurality of communication devices includes
      a portable communication device including a device electronic processor configured to
         receive the scheduling information from the call controller, and
         transmit the status data via a remote inbound time slot of a remote common channel synchronized with an inbound time slot the local common TDMA channel.

17. The TDMA communication system of claim 16, wherein a second one of the plurality of communication devices includes
   a second portable communication device including
      a second device electronic processor configured to
         receive the scheduling information from the call controller via a second inbound time slot associated with the control channel of the local common TDMA channel, and
         transmit the status data during a second outbound time slot based on the scheduling information that is received from the call controller.

* * * * *